United States Patent [19]

Oberkobusch et al.

[11] Patent Number: 4,859,721
[45] Date of Patent: Aug. 22, 1989

[54] ADDUCTS OF CARBOXYLIC ACIDS AND ISOCYANATES WITH EPOXIDES, AQUEOUS DISPERSIONS CONTAINING THESE ADDUCTS, PROCESSES FOR THEIR PREPARATION AND THEIR USE IN THE AUTOPHORETIC COATING OF METALLIC SURFACES

[75] Inventors: Doris Oberkobusch, Duesseldorf; Roland Morlock, Bergheim; Karl-Heinz Stritzke, Langenfeld; Ludwig Schieferstein, Ratingen, all of Fed. Rep. of Germany

[73] Assignee: Henkel Kommaditgesellschaft auf Aktien, Duesseldorf, Fed. Rep. of Germany

[21] Appl. No.: 233,621

[22] Filed: Aug. 17, 1988

[30] Foreign Application Priority Data

Aug. 17, 1987 [DE] Fed. Rep. of Germany ....... 3727382

[51] Int. Cl.$^4$ ............................................. C08L 75/04
[52] U.S. Cl. ................... 523/402; 427/386; 528/45; 528/49; 528/112; 528/115; 528/365
[58] Field of Search ................ 523/402; 528/45, 49, 528/112, 115, 365; 427/386

[56] References Cited

U.S. PATENT DOCUMENTS

| | | | |
|---|---|---|---|
| 3,585,084 | 6/1971 | Steinbrecher et al. | 427/435 |
| 3,839,097 | 10/1974 | Hall et al. | 148/6.2 |
| 4,318,944 | 3/1982 | Hall | 427/377 |
| 4,347,172 | 8/1982 | Nishida et al. | 524/319 |

FOREIGN PATENT DOCUMENTS 2612995 10/1976 Fed. Rep. of Germany .

Primary Examiner—Maurice J. Welsh
Attorney, Agent, or Firm—Ernest G. Szoke; Wayne C. Jaeschke; Real J. Grandmaison

[57] ABSTRACT

The invention relates to polymers of formula (I)

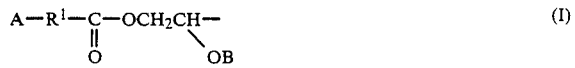

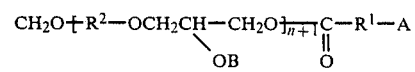

in which $R^1$ and $R^2$ represent optionally substituted alkylene, cycloalkylene or phenylene radicals, A represents hydrogen or carboxyl groups, B represents hydrogen or groups derived from carboxylic acids or isocyanates. The invention also relates to aqueous epoxy resin dispersions containing one or more polymers of general formula (I) in addition to bases, acid, one or more emulsifiers and, optionally, other active substances and auxiliaries typically used in epoxy resin dispersions and also water.

The invention also relates to a process for the production of such aqueous epoxy resin dispersions and to the use of such resins in processes for the autophoretic coating of metallic surfaces.

41 Claims, No Drawings

ADDUCTS OF CARBOXYLIC ACIDS AND ISOCYANATES WITH EPOXIDES, AQUEOUS DISPERSIONS CONTAINING THESE ADDUCTS, PROCESSES FOR THEIR PREPARATION AND THEIR USE IN THE AUTOPHORETIC COATING OF METALLIC SURFACES

BACKGROUND OF THE INVENTION

1. Field of the Invention:

This invention relates to adducts of carboxylic acids and isocyanates with epoxides, to aqueous dispersions containing such adducts, to a process for the preparation of such epoxy resin dispersions and to their use in the autophoretic coating of metallic surfaces.

Metallic surfaces, particularly the surfaces of metal components used in the automotive industry, are coated with a first base lacquer for protection against corrosion and to improve the adhesion of decorative surface lacquers. This base coat is applied to the metal surface by a process known as "cathodic electrodeposition" (CED). It consists of polymers bearing cationic groups which are generally based on an epoxy resin and contain a hardener which is intended to bring about crosslinking of the polymer molecules and, hence, a sealing of the lacquer layer through hardening. Base coats applied by CED provide the metal surfaces with good protection against corrosion. For this reason alone, CED is used worldwide for applying base coats to metal surfaces.

However, despite good results in terms of corrosion prevention, cathodic electrodeposition is attended by serious disadvantages. Thus, any voids in the metal workpiece can only be very inadequately coated. In addition, the process requires the application of an electrical voltage for deposition of the resin to the metallic surface. As a result, plants for the CED process are extremely expensive and, in addition, require elaborate safety measures for personnel working on the plant.

2. Statement of Related Art:

The disadvantages mentioned above do not attend processes for the autophoretic coating of metallic surfaces. This process uses emulsion polymers, for example based on acrylate or styrene/butadiene, which are anionically stabilized. The particle sizes are typically in the range from 80 to 150 nm. The dispersions show adequate acid stability for the process. The organic polymers are normally deposited on the metal surface using a so-called "starter" of HF/FeF3. Autophoretic chemical coating (ACC) processes such as these are described in a number of publications, of which DE-PS No. 26 12 995 and U.S. Pat. Nos. 3,585,084, 3,839,097, 4,318,944 and 4,347,172 are mentioned by way of example. However, compared with CED processes, ACC processes are still attended by the disadvantage that the polymer cannot be crosslinked on the metal surface through the incorporation of hardeners in the polymerization mixture. This results in layers which are permeated by "pores" and which thus make the metal beneath the layers more susceptible to corrosion than layers applied by CED. Although bridging or rather crosslinking complexing of the polymer molecules can be obtained by subsequently rinsing the layers applied by the ACC process with an aqueous bath containing chromium ions, it is desirable on ecological and toxicological grounds to limit or even completely avoid the use of chromium-containing rinsing solutions.

By contrast, one of the objects of the present invention is to provide polymers suitable for the ACC process which form crosslinked layers that afford effective protection against corrosion, even without the use of chromium-containing rinsing solutions, and in addition, are solvent-resistant.

Polymers intended for use in autophoretic coating have to be very finely dispersible in water (particle size below about 300 mm). In addition, dispersion and polymer must be stable in the pH range from 1.5 to 8. Dispersions based on epoxy resins and hardeners (crosslinking agents) which satisfy these requirements have not hitherto been available. The epoxy resins used in cathodic electrodeposition cannot be used in autophoretic coating processes.

Accordingly, another object of the present invention is to provide finely divided hardener-containing epoxy resin dispersions which are stable at pH values in the range from 1.5 to 8 and which can be applied by autophoretic coating, giving crosslinked, corrosion-resistant and solvent-resistant coatings without the additional use of chromium-containing rinsing solutions.

BRIEF SUMMARY OF THE INVENTION

It has now been found that aqueous polymer dispersions based on an epoxy resin which contain codispersed dispersants or dispersants incorporated in the polymer and hardeners are eminently suitable for use in the autophoretic coating of metallic surfaces, leading to primer coatings which afford the metallic surfaces a high degree of protection against corrosion without any need for the coatings to be rinsed with chromium-containing solutions.

The present invention relates to polymers corresponding to the following general formula

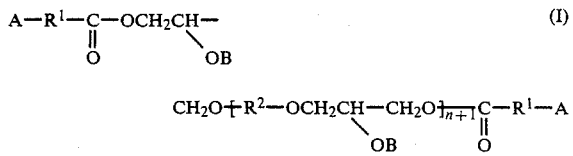

in which
- $R^1$ represents linear or branched, saturated or unsaturated $C_2$–$C_{16}$ alkylene radicals optionally containing one or more substituents, cycloalkylene radicals optionally containing one or more substituents or 1,2-phenylene, 1,3-phenylene or 1,4-phenylene radicals optionally containing one or more substituents,
- $R^2$ represents linear or branched $C_1$–$C_8$ alkylene radicals, phenalkylene or phenalkylphenylene radicals containing 1 to 4 carbon atoms in the alkylene portion,
- n is a number of from 0 to 6,
- A represents hydrogen or COOH,
- B represents hydrogen, a group corresponding to the following general formula

in which $R^1$ and A are as defined above, or a group corresponding to the following general formula

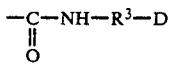 (III)

in which $R^3$ is an alkylene radical containing 1 to 8 carbon atoms in the chain which may optionally contain linear or branched alkyl groups or optionally alkyl-substituted cycloalkyl or aryl groups or optionally alkyl-substituted ureylene groups or carbamido groups, a cycloalkylene radical containing 5 to 8 carbon atoms in the ring, which may optionally contain linear or branched alkyl groups or optionally alkyl-substituted cycloalkyl or aryl groups or optionally alkyl-substituted ureylene groups or carbamido groups, or an arylene radical containing 1 to 4 aromatic rings fused to one another or joined to one another by $C_1$-$C_3$ alkylene bridges and optionally containing one or more alkyl or alkylene substituents and D is an NCO group masked by a protective group;

within one and the same molecule, the substituents B may differ from one another in their respective meanings.

The present invention also relates to aqueous epoxy resin dispersions containing the following components: one or more polymers corresponding to general formula (I)

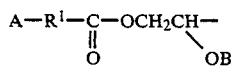 (I)

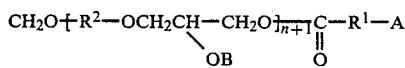

in which $R^1$, $R^2$, n, A and B are as defined above, one or more organic or inorganic acids, one or more organic or inorganic bases, one or more emulsifiers and, optionally, other active components and auxiliaries typically used in epoxy resin dispersions and water.

The present invention also relates to a process for the preparation of aqueous dispersions containing one or more polymers corresponding to general formula (I)

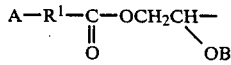 (I)

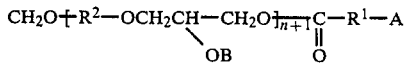

in which $R^1$, $R^2$, n, A and B are as defined above, characterized in that polymers corresponding to the following general formula

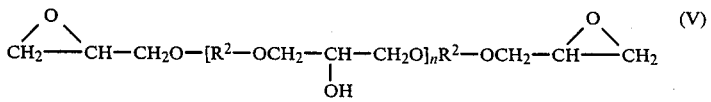 (V)

in which $R^2$ and n are as defined above, are reacted either with dicarboxylic acids corresponding to the following general formula

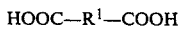 (VI)

in which $R^1$ is as defined above, or with mixtures of monocarboxylic acids (VII)

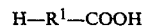 (VII)

in which $R^1$ is as defined above, and dicarboxylic acids (VI) or initially with monocarboxylic acids (VII) and/or dicarboxylic acids (VI) and then with dicarboxylic and/or tricarboxylic anhydrides to form polymers corresponding to the following general formula

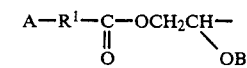 (I)

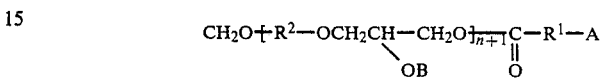

in which $R^1$, $R^2$, n and A are as defined above and B represents H or a group corresponding to formula (II), after which isocyanates corresponding to the following general formula

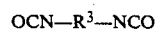 (IX)

in which $R^3$ is as defined above, are either reacted in a molar ratio of 1:0.9 to 1:1.1 with a compound from the group consisting of alcohols, phenols, oximes, ε-caprolactam, malonic esters and ethyl acetoacetate as masking agents and the isocyanates thus partly masked are added onto at most 50% of the free OH groups of the polymer (I), in which B is H or a group corresponding to formula (II), to form the polymer (I)

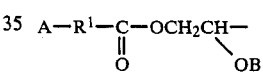 (I)

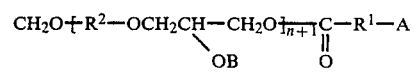

in which $R^1$, $R^2$, n, A and B are as defined above, or isocyanates corresponding to general formula (IX) are completely blocked with the masking agents mentioned and the isocyanates thus masked are mixed with the polymer (I), after which polymer (I) containing the bound isocyanate or polymer (I) and completely masked isocyanate are dissolved in a solvent, the resulting solution is neutralized with a base and, after addition of an emulsifier, is diluted with water, the dispersions thus obtained are acidified, the organic solvent is removed and a starter suitable for autophoretic coating is optionally added.

The present invention also relates to the use of such aqueous epoxy resin dispersions containing one or more polymers corresponding to general formula (I)

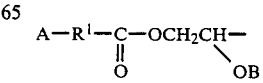 (I)

-continued
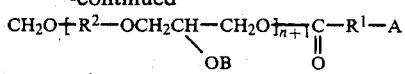

which $R^1$, $R^2$, n, A and B are as defined above, in processes for the autophoretic coating of metallic surfaces.

DETAILED DESCRIPTION OF THE INVENTION

Other than in the operating examples, or where otherwise indicated, all numbers expressing quantities of ingredients or reaction conditions used herein are to be understood as modified in all instances by the term "about".

The polymers of general formula (I), which are described in detail in the following, are new compounds. In the process for their production which is described hereinafter, they are generally not formed as individual compounds, but instead—depending on the molar ratio between the reaction components and on the reaction conditions—may differ in their degree of polymerization (different value for n in general formula (I)) or may contain different substituents which, where defined starting components are used, is attributable to the fact that the hydroxyl groups obtained during addition of the carboxylic acid onto the epoxide through opening of the oxirane ring react differently with the partially masked isocyanates. Accordingly, in one and the same molecule corresponding to general formula (I), the substituents B may either be hydrogen or may have one of the other meanings defined more closely in the following.

The aqueous epoxy resin dispersions according to the invention contain as their principal constituent one or more polymers corresponding to general formula (I)

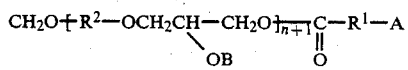

According to the invention, epoxy resin dispersions of the type in question may contain as their polymeric component only one of the polymers falling within the scope of general formula (I) provided that—in the context of the reactions normally undertaken at polymeric molecules—the individual substituents $R^1$, $R^2$, A and B and also the index n have specific meanings. According to the invention, however, the aqueous epoxy resin dispersions may also contain several polymers corresponding to general formula (I), by which are meant both polymers differing in their degree of polymerization (different meanings of n) and also in the meanings of the individual substituents $R^1$, $R^2$, A and B and also polymers, in the molecule of which the substituents B have different meanings from one another.

In general formula (I) above, $R^1$ represents linear or branched, saturated or unsaturated $C^2-C^{16}$ alkylene radicals optionally containing one or more substituents, by which are meant linear radicals from the group consisting of ethylene, propylene, tetramethylene, pentamethylene, hexamethylene, heptamethylene, octamethylene, nonamethylene, decamethylene, undecamethylene, dodecamethylene, tridecamethylene, tetradecamethylene, pentadecamethylene and hexadecamethylene and also branched homologs thereof.

In addition to the saturated alkylene radicals, $R^1$ in the polymers corresponding to general formula (I) may also represent unsaturated alkylene radicals containing a corresponding number of carbon atoms which may even be present in dimeric form ("dimeric alkyl radicals") and, in that case, may contain up to 32 carbon atoms. Generally, it may be said that polymers corresponding to general formula (I), in which $R^1$ represents linear, saturated $C_2-C_{16}$ alkylene radicals, are preferred.

The groups $R^1$ in the polymers corresponding to general formula (I) are either unsubstituted or contain one or more substituents. By "substituents" are meant groups which replace one or more hydrogen atoms of the $CH_2$ groups in the alkylene chain. Preferred substituents such as these are hydroxy and/or carboxy groups, because according to the invention these groups additionally contribute towards improving the self-dispersion of the epoxy resins in the aqueous phase. One example of a possible group represented by $R^1$ in the polymers (I) according to the invention is the 2-carboxy-2-hydroxypropylene group.

In addition, the aqueous epoxy resin dispersions according to the invention may contain one or more polymers corresponding to general formula (I), in which $R^1$ represents 1,2-phenylene, 1,3-phenylene or 1,4-phenylene groups which may even contain one or more substituents. In this case, too, preferred substituents of the aromatic radicals are hydroxy groups and/or carboxy groups, i.e. generally polar groups which can also contribute towards improving the self-dispersibility of the polymers in the aqueous phase. Polymers of general formula (I), in which $R^1$ is a 1,4-phenylene group without further substituents, are preferred in the aqueous epoxy resin dispersions according to the invention.

In a particularly advantageous embodiment, the aqueous epoxy resin dispersions according to the invention contain one or more polymers corresponding to general formula (I), in which $R^1$ represents linear, saturated $C_2-C_{10}$ alkylene radicals. Of these polymers, those in which $R^1$ represents tetramethylene, pentamethylene, hexamethylene, heptamethylene or octamethylene are preferred.

In the polymers of general formula (I), which are present individually or severally in the aqueous epoxy resin dispersions, $R^2$ represents linear or branched $C_1-C_8$ alkylene radicals or phenalkylene or phenalkylphenylene radicals containing 1 to 4 carbon atoms in the alkylene portion. Among the alkylene radicals, therefore, suitable substituents $R^2$ are the linear radicals methylene, ethylene, propylene, tetramethylene, pentamethylene, hexamethylene, heptamethylene and octamethylene and also the corresponding branched-chain homologs; in the polymers of general formula (1) present in the dispersions, the linear alkylene radicals are preferred substituents $R^2$. The alkylene radicals in the polymers may also be replaced by phenalkylene radicals containing 1 to 4 carbon atoms in the alkylene portion in the position denoted by $R^2$ in general formula (I). Phenalkylene radicals are understood to be, for example, such radicals as the benzylene group, the phenethylene group, the 1-phenylpropylene or 2-phenylpropylene group or the phenyl tetramethylene group or isomers thereof containing branched alkylene radicals.

In addition, in the polymers corresponding to general formula (I), $R^2$ may also represent phenalkylphenylene radicals which are understood to include any radicals in which two phenylene groups are bridged by a $C_1-C_4$ alkylene radical. According to the invention, therefore, two phenylene radicals may be bridged by a methylene radical, an ethylene radical, an n-propylene radical, an i-propylene radical, an n-butylene radical, an i-butylene radica or a t-butylene radical; the two phenylene groups may be bound to different carbon atoms of the alkylene radicals or to one carbon atom of the alkylene radicals. According to the invention, polymers of general formula (I), in which $R^2$ is a 2,2-diphenylene propylene radical, are particularly preferred for the aqueous epoxy resin dispersions.

The epoxy resin dispersions according to the invention contain one or more polymers corresponding to general formula (I), in which n is a number of from 0 to 6. Since the compounds corresponding to general formula (I) are polymers, this statement should be interpreted to mean that the index n indicates the average degree of polymerization of the polymers, i.e. the average number of recurring units in the molecule corresponding to general formula (I). Depending on the character and origin of the polymer, this index may vary over more or less wide bands within the ranges indicated and is preferably in the range from 2 to 4.

In the polymers (I), A represents hydrogen or a carboxyl group, depending on the choice of the starting components. This is because, in the process described in detail hereinafter, dicarboxylic acids in which A more or less without exception represents carboxyl groups may be used without exception for the introduction of polar groups into the starting polymer. However, mixtures of monocarboxylic acids and dicarboxylic acids or, initially, only monocarboxylic acids and, for the subsequent introduction of carboxyl groups in a second step, di- and/or tricarboxylic anhydrides may also be used for the reaction of the starting polymer to the polymers corresponding to general formula (I). This gives polymers (I) which contain a more or less large number of hydrogen atoms at the chain ends. The number of hydrogen atoms represented by A depends upon the molar ratio of monocarboxylic acids to dicarboxylic acids in which the starting polymers are reacted to the polymers corresponding to general formula (I). The sole function of the carboxyl groups represented by A is to guarantee the self-dispersibility of the polymers (I). They do not function as crosslinking hardeners and may therefore be detected as acidic side groups in the cross-linked, thermally hardened polymer.

In the polymers corresponding to general formula (I) which are present in the aqueous epoxy resin dispersions, the substituent B represents hydrogen, a group corresponding to general formula (II)

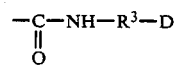  (II)

in which $R^1$ and A are as defined above, or a group corresponding to general formula (III)

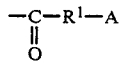  (III)

in which
R$^3$ is an alkylene radical containing 1 to 8 carbon atoms in the chain, which may optionally contain linear or branched alkyl groups or optionally alkyl-substituted cycloalkyl or aryl groups or optionally alkyl-substituted ureylene groups or carbamido groups, a cycloalkylene radical containing 5 to 8 carbon atoms in the ring, which may optionally contain linear or branched alkyl groups or optionally alkyl-substituted cycloalkyl or aryl groups or optionally alkyl-substituted ureylene groups or carbamido groups, or an arylene radical containing 1 to 4 aromatic rings fused to one another or joined to one another by $C_1$-$C_3$ alkylene bridges and optionally containing one or more alkyl or alkylene substituents and D is an NCO group masked by a protective group.

If the meanings for $R^1$ and A defined in detail in the foregoing are applied to the group corresponding to general formula (II) for which B may stand in addition to hydrogen, this means that the polymers corresponding to general formula (I), which may be present in the aqueous epoxy resin dispersions, may also partly contain a residue of a dicarboxylic acid or tricarboxylic acid (A=COOH), attached in the form of an ester through the hydroxy group of the polymer, at the places denoted by B. In this case, the substituents $R^1$ emanate from the groups described in detail in the foregoing and, accordingly, may be alkylene radicals, cycloalkylene radicals or phenylene radicals which may optionally contain one or more substituents within their group.

However, the substituent B in general formula (I) may also partly represent a group corresponding to general formula (III). As shown in the process steps described in detail hereinafter, radicals such as these are formed by reaction of diisocyanates or higher isocyanates with the hydroxy groups of the carboxylated polymer, after which the polymers may contain groups of general formula (III) at some of the places where, previously, free hydroxy groups were present in the polymer. When the polymer layers applied are subsequently heat-treated, these groups serve to crosslink the individual polymer molecules with one another and hence to bring about hardening of the polymer on the metallic surface. As explained in detail in the following description of the process according to the invention, it is possible both to introduce corresponding diisocyanates or higher isocyanates into the polymer molecule as "internal hardeners" and also to add them in completely masked form to the polymer mixture and subsequently to harden the polymer layer by crosslinking during the thermal after treatment. In preferred embodiments, the aqueous epoxy resin dispersions contain one or more polymers corresponding to general formula (I) which contain groups of general formula (III) attached through some of the previously free hydroxy groups in the polymer molecule which function as "internal hardeners" and, through the isocyanate groups (NCO groups), bring about hardening of the polymer by crosslinking on the metallic surface.

In the groups of general formula (III)

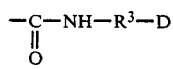  (III)

R$^3$ is, for example, an alkylene radical containing 1 to 8 carbon atoms in the chain. Accordingly, alkylene radicals such as these ethylene, propylene, tetramethylene, pentamethylene, hexamethylene, heptamethylene and octamethylene. These alkylene chains may optionally contain one or more linear or branched alkyl groups as substituents anywhere in the molecule, these alkyl groups normally containing no more than 4 carbon atoms and, in preferred embodiments, being linear. Straight-chain alkylene radicals represented by $R^3$ may with particular advantage contain methyl or ethyl radicals as substituents. Hexamethylene radicals and methyl-substituted homologs thereof are preferred. However, optionally alkyl-substituted cycloalkyl and aryl groups are also possible substituents. In this case, too, the alkyl substituents also contain at most 4 carbon atoms and are normally linear. However, ureylene groups or carbamido groups are also possible substituents for the alkylene radicals. The ureylene groups, which correspond to the general formula —NH—C-(O)—NH—, may possibly also be alkyl-substituted, in which case it is also possible to close several such groups together to form chain-like or cyclic molecules. Equally, the arylene radicals represented by $R^3$ in general formula (III) may also be interpreted as carbamido—(—NH—C=O)— which may also be alkyl-substituted and of which several may be closed together to form cyclic ring systems.

$R^3$ in general formula (III) may also represent cycloalkylene radicals containing 5 to 8 carbon atoms in the ring. Accordingly, cycloalkylene radicals of the type in question may be, for example, cyclopentylene, cyclohexylene, cycloheptylene or cyclooctylene. In principle, these cyclic radicals may optionally contain linear or branched alkyl groups or optionally alkyl-substituted cycloalkyl or aryl groups or optionally alkyl-substituted ureylene groups or carbamido groups as substituents. These groups thus emanate from the groups mentioned above as substituents of the alkylene radicals and accordingly, need not be separately mentioned again here. The preferred cycloaklyl group represented by $R^3$ is the group

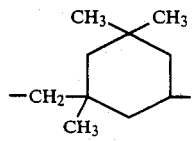

$R^3$ in general formula (III) may also represent arylene radicals containing one ring or two to four aromatic rings fused to one another. Accordingly, radicals such as these may be radicals from the group consisting of 1,2-phenylene, 1,3-phenylene, 1,4-phenylene, naphthylene, phenanthrenylene, anthracenylene, perylenylene and comparable, fused ring systems and may optionally contain alkyl radicals as substituents. Within this group, phenylene radicals, tolylene radicals and xylylene radicals are preferred. However, $R^3$ may also represent arylene radicals which are not directly fused to one another, but instead are joined to one another by $C_1$–$C_3$ alkylene bridges, preferably methylene bridges. These aromatic rings joined to one another by alkylene bridges may also be optionally substituted by one or more alkyl or alkylene substituents. The alkyl or alkylene substituents in question normally contain no more than 4 carbon atoms and preferably only 1 or 2 carbon atoms.

In general formula (III) above, D is an NCO group masked by a protective group. Accordingly, polymers of general formula (I), in which B may partly represent groups of general formula (III), D being an NCO group masked by a protective group, are used in the aqueous epoxy resin dispersions. This results from the fact that, in the production of the polymers corresponding to general formula (I), diisocyanates containing two differently reactive NCO groups are preferably introduced as "internal hardeners". One of these isocyanate groups is reacted with a reagent E-H which yields a protective group for NCO groups in order to keep this group blocked for the subsequent hardening reaction. Accordingly, polymers of general formula (I) are obtained, in which some of the substituents B represent a group (III), in which D is a group corresponding to the formula

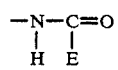 (IV)

in which E represents substituents from the group comprising alcoholate, phenolate, and oximate, caprolactamido, bis-(ethoxycarbonyl)-methyl and acetyl-(ethoxycarbonyl)-methyl. In the course of the thermal hardening of the polymer (I) applied to the metal surface, the protective group E-H, which protects the isocyanate group against premature reaction with the polymer molecule, i.e. for example the alcohol, malonic ester or acetoacetic ester or the phenol, oxime or caprolactam, is split off again, so that the NCO group is made available for the hardening reaction, i.e., the crosslinking of individual polymer molecules with one another.

In preferred embodiments, the polymers of general formula (I) present in the aqueous epoxy resin dispersions are structured in such a way that, in these polymers, $R^1$ represents linear or branched, saturated alkylene radicals containing 2 to 10 carbon atoms or 1,4-phenylene radicals, $R^2$ represents 2,2-diphenylene propylene, n is a number in the range from 2 to 4, A represents H or COOH and B represents hydrogen and/or a group of general formula (III), in which $R^3$ represents

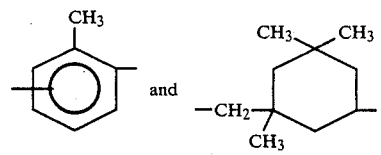

and D is a group corresponding to general formula (IV)

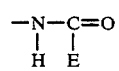 (IV)

in which E represents oximate or a caprolactamido group.

In other particularly preferred embodiments, the epoxy resin dispersions contain polymers corresponding to general formula (I), in the molecule of which at most 50% of the substituents B represent a group of general formula (III), in which $R^3$ and D are as defined above. Other preferred constituents of the dispersions according to the invention are polymers corresponding to general formula (I), in which at most 50% and preferably 15 to 35% of the substituents B within the molecule represent a group of general formula (III), in which $R^3$ and D are as defined above, an at least equimolar quantity, preferably 15 to 85% and more preferably 50 to 85% of the substituents B represent hydrogen and 0 to 70% and preferably 0 to 35% represent a group corresponding to general formula (II), in which $R^1$ and A are as defined above.

In addition to one or more polymers corresponding to general formula (I), the aqueous epoxy resin dispersions according to the invention also contain one or more emulsifiers. Because the epoxy resins are applied to the metallic surface by autophoretic coating, the emulsifiers used are primarily anionic emulsifiers. Suitable anionic emulsifiers are those which contain sulfate, sulfonate or sulfosuccinate groups as hydrophilic groups. Successful emulsifiers of this type are fatty alcohol ether sulfates and alkylphenol ether sulfates. The aqueous epoxy resin dispersions according to the invention preferably contain as emulsifiers fatty alcohol ether sulfates containing 12 to 18 carbon atoms in the alkyl group and 2 to 80 carbon atoms in the alkylene group or alkylphenol ether sulfates containing 8 to 12 carbon atoms in the alkyl group. Particularly preferred emulsifiers in aqueous epoxy resin dispersions are the sodium and/or ammonium salt of a fatty alcohol ether sulfate containing 12 to 14 carbon atoms in the fatty alkyl group and 4 ethoxy groups and the sodium and/or ammonium salt of a sulfatized adduct of 10 mol ethylene oxide with nonylphenol or 4 mol ethylene oxide with nonylphenol.

In addition to the components mentioned above, the aqueous epoxy resin dispersions according to the invention contain the acids and bases necessary for neutralization and for reacidification. Suitable bases are, in principle, aqueous solutions of alkali metal hydroxides and also $NH_3$ and organic amines. The acids used in the aqueous epoxy resin dispersions according to the invention are, on the one hand, mineral acids, such as sulfuric acid or phosphoric acid, and on the other hand organic acids, such as formic acid or acetic acid. The dispersions preferably contain phosphoric acid as the acid component.

Other possible components of the dispersions are active substances and/or auxiliaries of the type typically used in epoxy resin dispersions of the type in question, including for example levelling aids and catalysts for the urethane crosslinking reaction, for example dibutyltin dilaurate.

Like any dispersions of organic polymers used for autophoretic chemical coating (ACC), the epoxy resin dispersions according to the invention are also formulated on the basis of water. The polymer particles of which the polymers correspond to general formula (I) have an average particle diameter of below 300 nm in this aqueous phase. The resin particles in the epoxy resin dispersions according to the invention normally have an average particle diameter in the range from 100 to 250 nm.

The "starter" required to initiate the chemical deposition process on the metal surface may of course also be added to the aqueous epoxy resin dispersions. This starter normally consists of an acid or an iron salt thereof which is capable of attacking the metal surface to be subsequently coated by etching, i.e. by chemical reaction. Starters of HF and $FeF_3$ are normally used for dispersions from which organic polymers are to be deposited by the ACC process. Hydrofluoric acid/iron (III) fluoride starters are also the preferred starter compositions in the epoxy resin dispersions according to the present invention. The starter may also be added at the point of use.

Particularly preferred epoxy resin dispersions according to the invention which give particularly good layers affording excellent protection against corrosion and high resistance to solvents when applied to metallic surfaces by autophoretic coating contain one or more polymers corresponding to general formula (I)

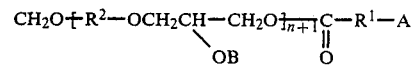

in which
$R^1$ represents linear, saturated alkylene radicals containing 2 to 10 carbon atoms or 1,4-phenylene radicals,
$R^2$ represents 2,2-diphenylene propylene,
n has a value of 2 to 4,
A represents H or COOH,
B represents hydrogen, a group (II)

in which $R^1$ and A are as defined above, and/or a group (III)

in which $R^3$ represents

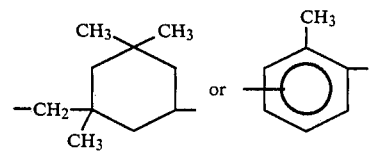

and D represents

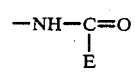

where E=oximate or caprolactamido, at most 50% and preferably 15 to 35% of the substituents B within the molecule representing a group corresponding to general formula (III), in which $R^3$ and D are as defined above, an at least equimolar quantity, preferably 15 to 85% and more preferably 50 to 85% of the substituents B representing hydrogen and 0 to 70% and preferably 0 to 70% representing a group of general formula (II), in which $R^1$ and A are as defined above, in quantities of 3 to 20% by weight, one or more emulsifiers from the group of fatty alcohol ether sulfates or nonylphenol ether sulfates in quantities of 0.02 to 4% by weight, ammonia or diethanolamine and also phosphoric acid, optionally other active substances and auxiliaries typically encountered in epoxy resin dispersions in quantities of 0.01 to 2% by weight, all the quantities indicated being based on the total weight of the dispersions, and water in a quantity which balances the quantities of the other components to 100% by weight.

The present invention also relates to the process for producing the aqueous epoxy resin dispersions described in detail in the foregoing containing one or more polymers corresponding to general formula (I). The first step of the process according to the invention comprises introducing into a suitable epoxidic starting polymer carboxyl groups which are capable of making the resin self-dispersible in the aqueous phase. It is particularly emphasized at this juncture that a difference in relation to polymers and also to processes known from the prior art may be seen in the fact that lateral carboxyl groups such as these are not introduced with a view to bringing about subsequent hardening of the polymer, as described for example in Houben-Weyl, Vo. 14/2 (1963), R. Wegler: "Polyadditions - und Polymerisationsprodukte von heterogenen Monomeren (Polyaddition and Polymerization Products of Heterogeneous Monomers)", pages 507 et seq. In contrast to the carboxyl groups in the polymer described there, which bring about hardening of the polymer molecules through crosslinking, the sole function of carboxyl groups introduced by the process according to the invention is to ensure that the polymer can be very finely dispersed in the aqueous phase. Accordingly, even after the thermal hardening reaction on the metal surface, the acidic lateral groups (carboxyl groups) are still entirely present in the form in which they were previously present in the dispersed polymer.

As described in the following, masked isocyanate groups are used for hardening in the polymers according to the invention, preferably being attached to the epoxy resin as "internal hardeners".

According to the invention, the step of introducing carboxyl groups ensuring self-dispersibility of the polymer may be carried out by several alternative methods. One possibility is to react polymers corresponding to general formula (V)

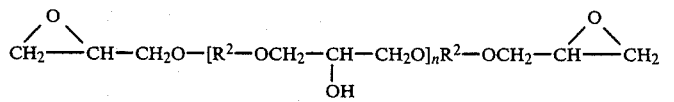

in which $R^2$ and n are as defined above, with dicarboxylic acids corresponding to general formula (VI)

$$HOOC-R^1-COOH \qquad (VI)$$

in which $R^1$ is as defined above. In addition, the polymer corresponding to general formula (V) may be reacted with mixtures of monocarboxylic acids corresponding to general formula (VII)

$$H-R^1-COOH \qquad (VII)$$

in which $R^1$ is as defined above, and dicarboxylic acids (VI). Self-dispersibility may also be achieved by initially reacting the epoxide groups in polymers corresponding to general formula (V) with monocarboxylic acids corresponding to general formula (VII) and then esterifying part of the OH group of the epoxy resin by reaction with di- and/or tricarboxylic anhydrides. In this reaction, the anhydride is merely opened with addition onto OH groups of the epoxy resin, so that the other COOH group(s) are available for imparting self-dispersibility.

In the first alternative, in which the polymers corresponding to general formula (V) are reacted with dicarboxylic acids corresponding to general formula (VI), the polymers formed contain on average one carboxyl group contributing to the self-dispersibility of the polymer in the molecule per acid molecule introduced. The acid molecules are introduced by the molecules of the dicarboxylic acids added being added onto the terminal oxirane rings of the polymer corresponding to general formula (V) and another hydroxy group available for further reactions being formed in the polymer molecule. The polymers formed in the course of this reaction correspond to general formula (I)

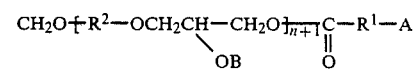

in which $R^1$ and $R^2$ are as defined above, A represents COOH and B represents H.

On the other hand, the polymers corresponding to general formula (V) may also be reacted with mixtures of monocarboxylic acids and dicarboxylic acids. In this case, the epoxide groups in the polymer molecule (V) are partly blocked so that they are no longer available for further reactions, while others of the epoxide groups contain carboxyl groups contributing towards the self-dispersibility of the polymer. In the third alternative, the polymers formed are primarily polymers in which the terminal positions are no longer available for further reactions (A=H), although the hydroxyl groups within the polymer are partly substituted by side chains containing carboxyl groups which bring about the self-dispersibility of the polymer. In the third alternative, it is also possible, by reaction with di- or tricarboxylic anhydrides, to introduce lateral groups into those polymers which, in the first step, were reacted with a mixture of mono- and dicarboxylic acids. In either case, polymers (I) are formed, in which B may represent hydrogen, a group of the general formula (II) and/or a group of the general formula (III).

Polymers suitable for use in the first step of the process according to the invention are any of a number of the polymers corresponding to general formula (V). However, it is preferred to use polymers which correspond to the bisphenol A-epichlorohydrin type, i.e. which contain a 2,2-diphenylenepropylene group as the substituent $R^2$. Aqueous epoxy resin dispersions containing derivatives of such polymers have proved to be very effective in the autophoretic coating of metal surfaces and, in particular, afford the metal surfaces with good protection against corrosion. In addition, resin layers such as these, after baking, withstand the aggressive effect of organic solvents.

Aliphatic dicarboxylic acids containing 2 to 16 carbon atoms in the alkylene radical are particularly suitable as the dicarboxylic acids used in the first step of the process according to the invention for the production of polymers corresponding to general formula (I). Accordingly, it is possible to use one or more acids from the group consisting of succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid, heptadecanedioic acid and octadecanedioic acid and also dimer fatty acids. Within the group of these acids, adipic acid, azelaic acid and sebacic acid are particularly preferred. The acids mentioned may be used individually to introduce carboxyl groups into the polymer of general formula (V) to improve its self-dispersibility. However, it is also possible to use two or more of these acids in admixture with one another to introduce carboxyl groups into the polymer to improve its self-dispersibility.

In addition to the aliphatic dicarboxylic acids mentioned, other dicarboxylic acids, for example aromatic dicarboxylic acids, such as terephthalic acid, are suitable for the process according to the invention for making the polymer self-dispersible in the aqueous phase.

If the reaction of the polymer corresponding to general formula (V) for introducing carboxyl groups promoting self-dispersibility is carried out with mixtures of monocarboxylic and dicarboxylic acids rather than with one or more dicarboxylic acids alone, the monocarboxylic acids used in the mixture correspond to the following general formula

$$H-R^1-COOH \qquad (VII)$$

in which $R^1$ is as defined above. Carboxylic acids containing 2 to 16 carbon atoms in the alkyl radical are preferably used as the monocarboxylic acids. Possible carboxylic acids from this group are propionic acid, butyric acid, valeric acid, caproic acid, oenanthic acid, caprylic acid, pelargonic acid, capric acid, undecanoic acid, lauric acid, tridecanoic acid, myristic acid, pentadecanoic acid, palmitic acid and margaric acid.

The dicarboxylic acids suitable for use in the mixture emanate from the group described in more detail in the foregoing. Of the aliphatic dicarboxylic acids, adipic acid, azelaic acid and/or sebacic acid are preferably used. The mixture of monocarboxylic acids and dicarboxylic acids used for the reaction has a molar ratio of the two components of from 0:1 to 1:1. In this case, too, it is possible—just as for the reaction with dicarboxylic acid alone—to use one or more components from the above-mentioned groups with one another.

According to the invention, the molar ratio of polymer (V) to dicarboxylic acid or dicarboxylic acid component in the monocarboxylic acid/dicarboxylic acid mixture is adjusted to a value of from 1:1 to 1:2. Any intermediate values, for example 2:3 or 3:4, are also possible. An adequate acid value in the end product obtained corresponding to general formula (I), in which $R^1$, $R^2$, n, A and B are as defined above, is crucial both to the molar ratio of polymer (V) to dicarboxylic acid and to the ratio by weight of monocarboxylic acid to dicarboxylic acid in the mixture and also to the choice of the individual acids for the reaction. The acid value, which is generally expressed as the quantity of KOH in milligrams for the titration of the acidic groups per gram substance, must be above 15 in polymers suitable for autophoretic coating. The acid value of the polymers according to the invention is normally in the range from 25 to 60 and preferably in the range from 30 to 45. Polymers having acid values in the preferred range are best obtained by reaction with dicarboxylic acids alone, so that this variant of the process according to the invention is preferably used for the preparation of the aqueous epoxy resin dispersions.

Another step of the process according to the invention for the preparation of aqueous epoxy resin dispersions comprises reacting isocyanates containing two or more NCO groups which correspond to general formula (IX)

$$OCN-R^3-NCO \qquad (IX)$$

in which $R^3$ is as defined above, with a reagent which protects the NCO groups against irreversible further reactions. Reagents such as these are normally known as "masking agents" which react with one or more NCO groups of the isocyanates in a reversible addition reaction, but may be subsequently released again under moderate conditions, for example by heating, thus making the reactive NCO group available again for further reactions, for example for crosslinking reactions. The masking reaction may be carried out with compounds containing acidic hydrogen, for example with a compound from the group comprising alcohols, phenols, oximes, ε-caprolactam, malonic ester and ethyl acetoacetate.

According to the invention, the progress of the reaction may be controlled through the molar ratio of isocyanate or NCO groups to masking agent. Thus, the masking reaction may be carried out with a molar ratio of isocyanate to masking agent of 1:0.9 to 1:1.1.

In this way, only some of the isocyanate groups, normally only on NCO group in the case of diisocyanates, is blocked by the masking agent. Accordingly, the partially masked isocyanate or the partially masked isocyanates may be added onto free OH groups of the polymer corresponding to general formula (VIII) in a following reaction step in which at most 50% of the free OH groups of the polymer are urethanized, so that an adequate number of OH groups is available for the subsequent crosslinking reaction. The necessary quantities of reaction components involve may readily be determined by stoichiometric calculation on the basis of the measurable OH value of the polymer or rather the isocyanate value of the isocyanate. Polymers of general formula (I), in which B at least partly represents groups corresponding to general formula (III), are prepared in this way. Depending on the isocyanate used, the groups (III) may contain alkylene groups, cycloalkylene groups or arylene groups which may optionally contain further alkyl, cycloalkyl, aryl, ureylene or carbamido groups as substituents. In that case, the group D in the groups of general formula (III) represented by B represents NCO groups masked by a protective group. In preferred embodiments, D represents a group corresponding to general formula (IV)

$$\begin{array}{c} -N-C=O \\ | \quad | \\ H \quad E \end{array} \qquad (IV)$$

in which E represents substituents selected from the group comprising alcoholate, phenolate, oximate, caprolactamido, bis-(ethoxy-carbonyl)-methyl and acetyl-(ethoxycarbonyl)-methyl.

On the other hand, it is also possible to react isocyanates corresponding to general formula (IX) with a masking agent from the group comprising alcohols, phenols, oximes, ε-caprolactam, malonic ester and ethyl acetoacetate in a molar ratio which ensures complete blocking of the isocyanate groups by the masking agent. Normally, at least 1 mol of the masking agent per mol isocyanate groups has to be used for this purpose. An oxime or ε-caprolactam is preferably used as the masking agent to maintain this molar ratio. In this case, both NCO groups of a diisocyanate or all the NCO groups of a higher isocyanate are blocked for further reactions, so that a direct reaction with the free hydroxy groups of the polymer can no longer take place. In this case, the polymer corresponding to general formula (1), in which $R^1$, $R^2$, n, A and B are as defined above, is mixed with the completely masked diisocyanate or higher isocyanate. In the presence of this so-called "external hardener", hardening crosslinking of the polymer molecules takes place when, on heating of the mixture during the hardening process, the molecules of the masking agent are split off again so that the free isocyanate groups are reavailable for a crosslinking hardening reaction.

Any of a number of compounds corresponding to general formula (IX) are suitable as isocyanates for the masking reaction or for the subsequent binding to the polymer molecule or for mixing therewith, the following compounds being mentioned purely by way of example: hexamethylene diisocyanate, biuret triisocyanate, trimethyl hexamethylene diisocyanate, 1,4-cyclohexyl diisocyanate, 4,4'-dicyclohexylmethane diisocyanate, isophorone diisocyanate, 4,4'-diphenylmethane diisocyanate, 2,4-toluene diisocyanate, 2,6-toluene diisocyanate, n-xylylene diisocyanate, 2-ethylene-1,2,3-tris-[3-isocyanato-4-methylanilinocarbonyloxy]-propane and 1,3,5-tris-(3-isocyanato-4-methylphenyl)-2,4,6-trioxohexahydro-1,3,5-triazine. Some of these isocyanates are commercially obtainable in pure form or even in the form of their isomer mixtures and may be used in this form for the masking reaction. Of the isocyanates mentioned above, it is preferred to use hexamethylene diisocyanate ($R^3 = -(CH_2-)_6$), 2,4-toluene diisocyanate or 2,6-toluene diisocyanate

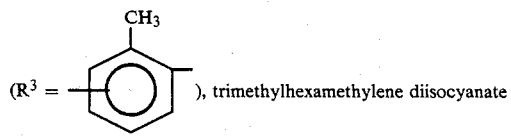

($R^3 = +CH_2-C(CH_3)_2-CH_2-CH(CH_3)CH_2-CH_2+$ and isophorone diisocyanate

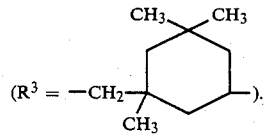

In the variant of the process where all the NCO groups of the isocyanate used are reacted with a masking reagent, so that the isocyanate cannot be bound to the polymer molecule as an "internal hardener", it is of advantage to introduce into the isocyanate polar groups of the type which can also facilitate self-dispersion of the isocyanate hardener in the aqueous phase. To this end, it is possible for example to react the isocyanate with a bifunctional compound which, on the one hand, enables the NCO group to be masked, for example a hydroxy group, but which on the other hand contains carboxyl groups which—as also in the polymer molecule—promotes self-dispersibility of the isocyanate hardener in the aqueous phase. Dimethylolpropionic acid is one example of such a reagent. If this compound is reacted with an isocyanate in a molar ratio of 1:2, for example with toluene diisocyanate blocked at one end, the OH group of the dimethylolpropionic acid is added onto the NCO group of the toluene diisocyanate, so that a carboxyl group contributing towards self-dispersibility is introduced into the diisocyanate.

The hardener may also be introduced into the aqueous phase in finely divided form and mixed with the self-dispersed polymer. As described above, however, it is preferred in the process according to the invention to bind the isocyanate compound to the macromolecule through the OH groups of the polymer and hence to incorporate the hardener in the polymer molecule.

In the process according to the invention, the reactions by which the polar carboxyl groups are introduced into the polymer corresponding to general formula (V) and/or the reaction of the polymer of general formula (I) obtained therefrom with the partially masked isocyanates and/or the reaction by which the protective group is introduced into the isocyanate molecule may be carried out in the presence of an organic solvent. Suitable organic solvents are any organic compounds which are liquid at room temperature, do not react with the polymer molecule or the isocyanate hardener and, subsequently, may readily be removed from the reaction mixture when the polymer and, optionally, the hardener are finely dispersed in the aqueous phase. Preferred solvents are relatively high-boiling aromatic hydrocarbons, for example toluene or xylenes, and also ketones, such as for example methylisobutylketone, methylethylketone or cyclohexanone, or esters, such as for example methyl glycol acetate. Of the solvents mentioned, cyclohexanone is preferred.

Where the reaction for introducing the polar groups into the polymer of general formula (V) and/or for introducing the protective group into the isocyanate molecule and/or the reaction of the partially masked isocyanate with the polymer corresponding to general formula (I) was carried out in the absence of a solvent, the organic solvent is added after the reaction of the polymer with the partially masked isocyanate and/or during mixing of the polymer (I) containing self-dispersing polar groups with the completely masked isocyanate. In this connection, it is important to ensure that the reaction components involved dissolve completely in the organic solvent used.

In a following process step, the resulting mixture of polymer, optionally masked isocyanate and organic solvent is neutralized or mildly alkalized with a base, i.e., adjusted to a pH value in the range from 6 to 9 and preferably in the range from 7.0 to 8.5 by addition of inorganic and/or organic bases, advantageously aqueous ammonia solution and/or diethanolamine. This step is preferably carried out using ammonia because ammonia is readily volatile and any excess can be conveniently removed thereafter. Finely divided dispersions having particle sizes below 300 nm are formed. Particle sizes in the range from 100 to 250 nm are preferably adjusted in the aqueous dispersion. During or immediately after the neutralization or alkalization step, the dispersions are diluted with water. The quantity of water added for this purpose is essentially the quantity which allows the formation of aqueous dispersions having an adequate solids content for autophoretic coating. The quantity of water in the aqueous resin dispersions according to the invention after dilution is normally between 80 and 97% by weight.

In addition, to prepare acid-stable dispersions, one or more emulsifiers known for this purpose from the prior art has to be added to the mixture. This may be done before or after addition of the water. In either case, however, it is important to ensure that the emulsifier(s) is/are added before addition of the starter for the autophoretic coating process. To carry out this process, anionic emulsifiers have to be added. Suitable anionic emulsifiers are compounds containing sulfate groups, sulfonate groups or sulfosuccinate groups as hydrophilic groups. Preferred emulsifiers are fatty alcohol ether sulfates and alkylphenol ether sulfates in which the alkyl radicals contain between 6 and 18 carbon atoms. Of the compounds mentioned, the water-soluble salts are normally used, the alkali metal or ammonium salts being preferred and the sodium or ammonium salts particularly preferred. The sodium or ammonium salts of sulfatized adducts of ethylene oxide with higher fatty alcohols or alkylphenols have proved to be emulsifiers which may be used with particular advantage. Of these, the sodium or ammonium salts of the sulfatized adducts of 4 mol ethylene oxide with a dodecanol/tetradecanol mixture and/or of 10 mol ethylene oxide with nonylphenol and/or of 4 mol ethylene oxide with nonylphenol are particularly preferred.

The quantities of emulsifiers are normally in the range from 0.02 to 4% by weight, quantities of from 0.07 to 0.3% by weight being preferred. These percentages by weight are based on the total weight of the aqueous epoxy resin dispersions.

After dispersion and after addition of the emulsifier, the neutral to mildly alkaline dispersion containing epoxy resins corresponding to general formula (I) is acidified. In principle, any acids of which the anions do not adversely affect the quality of the resin layers applied may be used for this purpose. Preferred acids are phosphoric acid as a mineral acid and formic acid and/or acetic acid as organic acids. Of the acids mentioned, phosphoric acid is particularly preferred for acidifying the aqueous epoxy resin dispersions. A pH value in the range from 4.5 to 3.0 is adjusted by addition of the aqueous acid solution. After addition of the acid, the organic solvent is removed by methods known per se from the prior art. This is normally done by a slight increase in temperature and/or by application of a vacuum. It is preferred to remove the organic solvent previously used more or less completely from the aqueous dispersions according to the invention.

If desired, the starter for the autophoretic deposition of the organic polymers onto the metal surfaces may be added to the resulting aqueous dispersions which are now free from organic solvent. A mixture of hydrofluoric acid and iron (III) fluoride is normally used as the starter for the deposition reaction. It is optionally added to the aqueous epoxy resin dispersions in quantities of from 0.3 to 1% by weight, although it may also be added in situ at the point of use.

Dispersions which contain one or more polymers corresponding to general formula (I) in addition to emulsifiers, bases, acids and other active substances and auxiliaries typically encountered in such epoxy resin dispersions and which remain stable in storage for several months at room temperature are formed in this way. In the present context, "stable in storage" means that dispersions of the type in question remain stable for prolonged periods and contain the polymers mentioned in the form of fine particles of small diameter. With polymers such as these, sealed coatings can be obtained on metal surfaces by the ACC process, providing the metal surfaces with effective protection against corrosion. In addition, the organic resin layers thus applied show excellent resistance to organic solvents after baking.

The aqueous epoxy resin dispersions according to the invention containing one or more polymers corresponding to general formula (I)

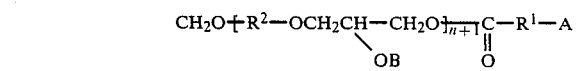

in which $R^1$, $R^2$, n, A and B are as defined above, are eminently suitable for use in processes for the autophoretic coating of metal surfaces. To this end, metal sheets, for example iron sheets, prepared in known manner, for example cleaned and degreased, are contacted with the aqueous dispersions in the same way as in the prior art. Through the aggressive attack of the acids, the salt concentration in the vicinity of the metal surface is increased so that the dispersion collapses at the metal/aqueous phase boundary layer and the epoxy resin polymer corresponding to general formula (I) is deposited onto the metal surface. The immersion process lasts about 30 to 360 seconds. The organic coagulate deposited on the metal surface is then rinsed with demineralized water and subsequently crosslinked for a prolonged period, for example for 10 to 60 minutes, at elevated temperature, i.e. at a temperature in the range from 60° to 200° C. and preferably at a temperature in the range from 140° to 180° C. As described above, the crosslinking hardeners used are the (internal) isocyanate hardeners incorporated in the molecule or the masked isocyanates externally added as hardeners which remove the protective group from the NCO group when the temperature is increased.

The coatings obtained with the dispersions according to the invention have a thickness of from about 15 to 30 mm, depending on the solids content of the dispersions and the immersion time of the sheets in the dispersions. After hardening, these films are thoroughly crosslinked and show high solvent resistance.

Where the dispersions according to the invention are used, there is no need for the epoxy resin layers deposited on the metal surfaces to be washed with aqueous chromium solutions for the purpose of further "sealing" the organic surface by bridging complexing, because the polymers obtained are sufficiently resistant and impervious even if they are not washed with an aqueous chromate solution, which is undesirable on toxicological and ecological grounds. However, it is readily possible under certain conditions —and with an increase in the quality of the coating—to wash the epoxy resin layers obtained with an aqueous chromate solution and thus further to improve corrosion prevention. Under normal conditions, however, washing with an aqueous chromate solution is not necessary.

In this way, it was possible for the first time to make epoxy resins accessible to the ACC process and hence to combine the well-known favorable properties of epoxy resins with the equally well-known advantages of autophoretic coating. Through the introduction of anionic groups, the epoxy resins can be dispersed in the aqueous phase in sufficiently finely divided and non-sedimenting form without the subsequent addition of mineral acids or an acidic starter (hydrofluoric acid) destabilizing the dispersion. In addition, the introduction of masked isocyanates as hardeners results in excellent hardening of the polymer layers deposited on the metal surfaces during baking.

The invention is illustrated by the following Examples.

EXAMPLE 1

Preparation of epoxy resins of general formula (I) containing anionic lateral groups which facilitate or promote self-dispersion.

500 g of a bisphenol A/epichlorohydrin epoxy resin (Epikote 1001 ®, a product of Shell; MW: approx. 900; epoxide value: 0.2 to 0.223; OH value 0.26) were dissolved while heating in 250 g methyl glycol acetate. 163 g adipic acid and 10 g of a 30% solution of benzyltrimethylammonium hydroxide in methanol were then added. The mixture was heated for about 8 h to 100° C.

The polymers of general formula (I) shown in Table 1 below were similarly prepared using the epoxy resin mentioned or a comparable epoxy resin (Rütapox 0164 ®, a product of Rü tgers; epoxide value: 0.53, molecular weight approx. 350 to 380) in organic solvents (for example cyclohexanone) and dicarboxylic acids.

EXAMPLE 2

Production of semi-masked isocyanates 100 g butanone-2-oxime were added dropwise under nitrogen to 200 g toluene diisocyanate over a period of 1.5 h. The solution was heated for about 1.5 h to 60° C. until an NCO content of 16.1% was reached.

Semi-masked isocyanates were prepared in the same way from isophorone diisocyanate and butanone-2-oxime or ε-caprolactam. The quantities reacted, the reaction conditions and the products obtained are shown in Table 2.

TABLE 2

Production of semi-masked isocyanates

| Example | Isocyanate | Quantity (g) | Masking agent | Quantity (g) | Conditions (°C./h) | NCO content (%) |
|---|---|---|---|---|---|---|
| 2a | toluene di-= | 200 | butanone-2-oxime | 100 | 60/1.5 | 16.1 |
| 2b | isophorone di-= | 258.1 | butanone-2-oxime | 101.2 | 60/1.5 | 13.6 |
| 2c | isophorone di-= | 222.0 | ε-caprolactam | 113 | 30-60/5 | 12.5 |

EXAMPLE 3

Preparation of hardener-containing epoxy resins corresponding to general formula (I)

250 g of the polymer of general formula (I) from Example 1a were dissolved in 310 g cyclohexanone and 190 g of the semi-masked isocyanate of Example 2c (66% solution in cyclohexanone) added to the resulting solution in an inert gas atmosphere of nitrogen. The solutions were heated for 10 h to 50°-75° C. until the NCO content was <0.1%.

Hardener-containing epoxy resins were prepared in the same way from other polymers of general formula (I) of Example 1 and the semi-masked isocyanates of Example 2. The quantities reacted together are shown in Table 3 below.

TABLE 1

Preparation of epoxy resins of general formula (I) containing COOH groups

| Example | Resin[1] | Quantity (g) | Acid | Quantity (g) | Solvent | Conditions (°C./h) |
|---|---|---|---|---|---|---|
| 1a | E | 500 | adipic acid | 163 | methylglycolacetate | 100/8 |
| 1b | R | 300 | azelaic acid | 224.5 | cyclohexanone | 100/8 |
| 1c | R | 200 | azelaic acid | 132.7 | cyclohexanone | 100/8 |
| 1d | E | 200 | adipic acid + caproic acid | 43.3 17.3 | cyclohexanone | 160/8 |
| 1e | E | 600 | palmitic acid + trimellitic anhydride | 343.1 | cyclohexanone | 100/12 + 100/3 |

[1]Resin: E = Epikote 1001 (Shell); R = Rutapox 0164 (Rutgers)

TABLE 3

Preparation of hardener-containing epoxy resins

| Example | Resin of Example | Quantity (g) | Isocyanate of Example | Quantity (g) | Solvent | Conditions (°C./h) |
|---|---|---|---|---|---|---|
| 3a | 1a | 250 | 2c | 190 | cyclohexanone | 50-75/10 |
| 3b | 1a | 100 | 2a | 24 | cyclohexanone | 50-60/10 |
| 3c | 1b | 200 | 2c | 39 | cyclohexanone | 40-60/10 |
| 3d | 1e | 77.6 | 2c | 18 | cyclohexanone | 40-60/10 |

EXAMPLE 4

Preparation of the aqueous epoxy resin dispersions using the product of Example 3a 0.1 g of a polysiloxane-based levelling said (50% in glycol monobutyl ether) and 0.5 g dibutyltin dilaurate (10% solution in cyclohexanone) and also 0.5 g of the sodium salt of the sulfatized adduct of 4 mol ethylene oxide with dodecanol/tetradecanol as emulsifier (30% solution in H₂O) and 70 g water were added to 17.5 g of the hardener-containing epoxy resin of Example 3a (50% solution in cyclohexanone). The dispersion was then adjusted to pH 8 with ammonia. A very finely divided dispersion (mean particle size: approx. 150 nm) was formed. Another 90 g water were added and the dispersion thus obtained was acidified by the dropwise addition of 20 g 5% phosphoric acid. The cyclohexanone was then removed in a rotary evaporator.

The dispersion formed remained stable for several months. No polymer solids sedimented, even after prolonged periods. Even the addition of a starter did not break the dispersion.

EXAMPLE 5

Coating of metal plates 7.5 g of a 10% aqueous HF-/FeF₃ solution were added to 150 g of the above-described dispersion which contained 5% polymer solids. The redox potential of the dispersion was adjusted to a value of from −300 to −400 mV by the addition of 5% H₂O₂.

A degreased iron plate (quality: bodywork steel; dimensions: 70 m ×150 mm) was immersed in an autophoretic coating bath having this composition. The immersion time was 4 minutes. The coagulate deposited on the plate was briefly rinsed with demineralized water and the baked for 30 minutes at 160° C.

All the coatings were resistant to methylethylketone (MEK) (100 rubs).

Protection against corrosion was tested by the standard salt spray test (SS test) according to DIN 50021-SS. To this end, the coated plates were cross-hatched and subjected to the SS test. The results are shown in Table 4 below.

COMPARISON EXAMPLE

Plates of the same quality and dimensions as in Example 5 were coated by the ACC process with an emulsion polymer of styrene, acrylonitrile ethylhexyl acrylate, methacrylic acid and an anionic emulsifier (Primal WL-91, a product of Rohm & Haas) and subjected to the salt spray test mentioned in Example 5. The results are likewise shown in Table 4 below.

TABLE 4

| | Results of the salt spray test | | |
|---|---|---|---|
| Dispersion of Example | Cr wash (+) | SS test (h) | Penetration at cut (mm) |
| Comp. | no | 24 | Completely rusted |
| Comp. | yes | 500 | 3 |
| 3a | no | 500 | 7 |
| 3a | yes | 500 | 3 |

Note:
(+): immersion of the coated plate (1 minute) in a 4% aqueous solution of partly reduced Cr(VI) oxide.

We claim:
1. A polymer of the formula

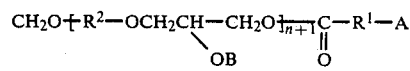

in which
R¹ is a linear or branched, saturated or unsaturated, substituted or unsubstituted, C₂–C₁₆ aliphatic radical, substituted or unsubstituted cycloalkylene radical, substituted or unsubstituted, 1,2-phenylene, substituted or unsubstituted 1,3-phenylene or substituted or unsubstituted 1,4-phenylene radical;
R² is a linear or branched C₁–C₈ aliphatic radical, phenalkylene or phenalkylphenylene radical each containing 1 to 4 carbon atoms in the alkylene radical;
n is a number of 0 to 6;
A is independently hydrogen or COOH;
B is independently hydrogen, a group of the formula

in which R¹ and A are as defined above, or a group of the formula

in which
R³ is independently an alkylene radical containing 1 to 8 carbon atoms in the chain, and can contain linear or branched alkyl groups, alkyl-substituted cycloalkyl, alkyl substituted aryl groups, alkyl-substituted ureylene group, alkyl substituted carbamido groups, a cycloalkylene radical containing 5 to 8 carbon atoms in the ring, which can contain linear or branched alkyl groups, alkyl substituted cycloalkyl groups, aryl groups alkyl-substituted ureylene groups, carbamido groups, or an arylene radical containing 1 to 4 aromatic rings fused to one another, arylene groups, joined to one another by C₁–C₃ alkylene bridges, which can contain one or more alkyl or alkylene substituents, and
D is an NCO group masked by a protective group; the substituents B may have different meanings within one and the same molecule.

2. A polymer of the formula (I) of claim 1, wherein R¹ represents a linear or branched, saturated alkylene radical containing 2 to 10 carbon atoms or a 1,4-phenylene radical,
R² represent 2,2-diphenylenepropylene;
n is a number in the range from 2 to 4;
A is independently H or COOH; and
B is independently hydrogen or a group corresponding to the formula (III)

in which

R³ is independently

[structure: methylphenyl with CH₃] or [structure: cyclohexyl with CH₃, CH₃, CH₃ substituents, connected via —CH₂—]

and D is a group of the formula $$-\underset{\underset{H}{|}}{N}-\underset{\underset{E}{|}}{C}=O \qquad (IV)$$

wherein E is oximate or caprolactamido; the substituents B may be different within one and the same molecule.

3. A polymer of the formula (I) as claimed in claim 1 wherein not more than about 50% of the substituents B within the molecule represent a group of general formula (II), in which R³ and D are as defined above, and an at least equimolar quantity of the substituent B is hydrogen.

4. A polymer of the formula (1) as claimed in claim 1 wherein not more than about 50% of the substituents B within the molecule represent a group of the formula (II), in which R³ and D are as defined above, and about an equimolar quantity, preferably 15 to 85% of the substituents B are hydrogen and 0 to 70% of a group of the formula (11), in which R¹ and A are as defined above.

5. An aqueous epoxy resin dispersion containing at least one polymer of the formula (I)

$$A-R^1-\underset{\underset{O}{\|}}{C}-OCH_2CH-\underset{OB}{\diagdown} \qquad (I)$$

$$CH_2O\mathord{\left(R^2-OCH_2CH-CH_2O\right)_{\overline{n+1}}}\underset{\underset{O}{\|}}{C}-R^1-A$$
$$\phantom{CH_2O(R^2-OCH_2CH-}\underset{OB}{\diagdown}$$

in which
R¹ is a linear or branched, saturated or unsaturated, substituted or unsubstituted, C₂–C₁₆ aliphatic radical, substituted or unsubstituted cycloalkylene radical, substituted or unsubstituted, 1,2-phenylene, substituted or unsubstituted 1,3-phenylene or substituted or unsubstituted 1,4-phenylene radical;
R² is a linear or branched C₁–C₈ aliphatic radical, phenalkylene or phenalkylphenylene radical each containing 1 to 4 carbon atoms in the alkylene radical;
n is a number of 0 to 6;
A is independently hydrogen or COOH;
B is independently hydrogen, a group of the formula $$-\underset{\underset{O}{\|}}{C}-R^1-A \qquad (II)$$

in which R¹ and A are as defined above, or a group of the formula $$-\underset{\underset{O}{\|}}{C}-NH-R^3-D \qquad (III)$$

in which
R³ is independently an alkylene radical containing 1 to 8 carbon atoms in the chain, and can contain linear or branched alkyl groups, alkyl-substituted cycloalkyl, alkyl substitute aryl group, alkyl-substituted ureylene group, alkyl substituted carbamido group, an arylene radical containing 1 to 4 aromatic rings fused to one another, arylene group, joined to one another by C₁–C₃ alkylene bridges which can contain one or more alkyl or alkylene substituents and
D is an NCO group masked by a protective group; the substituents B may have different meanings within one and the same molecule,
at least one organic or inorganic base, at least one organic or inorganic acid, at least one emulsifier and other active substances and auxiliaries typically encountered in epoxy resin dispersions and water.

6. An aqueous epoxy resin dispersion of claim 5 containing at least one polymer corresponding to the formula (1), in which R¹ is a linear, saturated C₂–C₁₆ aliphatic radical.

7. An aqueous epoxy resin dispersion of claim 5 containing at least one or more polymer of the formula (I), in which R¹ represent independently selected linear, saturated C₂–C₁₀ alkylene radicals containing at least one hydroxy and/or carboxy group as a substituent.

8. An aqueous epoxy resin dispersion of claim 5 containing at least one polymer of the formula (I), in which R¹ is a substituted cycloalkylene radical or dimeric fatty alkylene radical.

9. An aqueous epoxy resin dispersion of claim 5 containing at least one polymer of the formula (I), in which R¹ is a 1,4-phenylene radical.

10. An aqueous epoxy resin dispersion of claim 5 containing at least one polymer of the formula (I), in which R² is a phenalkylphenylene radical containing 1 to 4 carbon atoms in the alkylene group.

11. An aqueous epoxy resin dispersion of claim 10 containing at least one polymer of the formula (I), in which R² is a 2,2-diphenylenepropylene radical.

12. An aqueous dispersion of an epoxy resin of claim 1 containing at least one polymer of the formula (I), in which a portion of the substituents B represent a group of the formula (III)

$$-\underset{\underset{O}{\|}}{C}-NH-R^3-D \qquad (III)$$

which
R³ can be $$-(\mathrm{CH_2})_{\overline{6}},\ -CH_2-\underset{\underset{CH_3}{|}}{\overset{\overset{CH_3}{|}}{C}}-CH_2-\underset{\underset{CH_3}{|}}{CH}-(CH_2)_2-,$$
[structure: methylphenyl with CH₃] or and 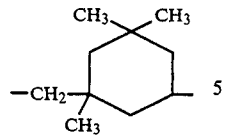

and D is an NCO group masked by a protective group.

13. An aqueous epoxy resin dispersion of claim 12 containing at least one polymer of the formula (I) in which a portion of the substituents B is a group of the formula (III), in which R³ is

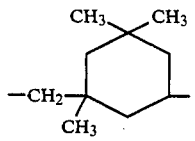

14. An aqueous epoxy resin dispersion of claim 12 containing at least one polymer of the formula (I), in which a portion of the substituents B is a group of formula (III), in which D represents a group of formula (IV)

$$-\underset{H}{N}-\underset{E}{C}=O \qquad (IV)$$

wherein E is a radical from the group consisting of alcoholate, phenolate, oximate, caprolactamido, bis-(ethoxycarbonyl)-methyl and acetyl-(ethoxycarbonyl)-methyl.

15. An aqueous dispersion of an epoxy resin of claim 1 containing at least one polymer of the formula (I), in which at most 50% of the substituents B represent a group of the formula (III), in which R³ and D are as defined above, and at least an equimolar quantity of the substituents B represent hydrogen and 0 to 70% represent a group of the formula (II), in which R¹ and A are as defined above.

16. An aqueous dispersion of an epoxy resin of claim 1 containing from about 3 to about 20% by weight of at least one polymer of the formula (I) in which R¹ represents independently linear or branched, saturated aliphatic radical containing 2 to 10 carbon atoms or a 1,4-phenylene radical;

R² represents 2,2-diphenylpropylene;
n is a number of from 2 to 4;
A is independently H or COOH; and
B independently hydrogen, a group of the formula (II)

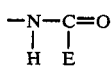

in which R¹ and A are as defined above, and/or a group of the formula (III)

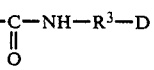

in which
R³ is

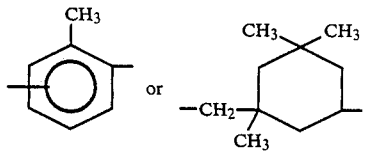

D is a group corresponding to the formula $$-\underset{H}{N}-\underset{E}{C}=O \qquad (IV)$$

wherein E is oximate or caprolactamido and wherein not more than about 50% of the substituents B within the molecule are a group of the formula (III), in which R³ and D are as defined above, and at least an equimolar quantity, of the substituents B representing hydrogen and 0 to 70% of substituents B are a group of general formula (II), in which R¹ and A are as defined above, and at least one emulsifier from the group sodium and ammonium salts of sulfatized adducts of 4 mol of ethylene oxide with dodecanol/tetradecanol, adducts of 10 mol of ethylene oxide with nonylphenol and adducts of 4 mol ethylene oxide with nonylphenol in an amount of from about 0.02 to about 4% by weight, phosphoric acid, ammonia and/or di-ethanolamine and other active substances and auxiliaries typically encountered in epoxy resin dispersions in an amount of up to about 2% by weight, all quantities being based on the total weight of the dispersion, and water in a quantity which balances the quantities of the other components to 100% by weight.

17. A process for the production of aqueous epoxy resin dispersions containing at least one polymer of the formula (I), R¹, R², n, A and B in general formula (I) having the meanings defined above, which comprises
(a) reacting a polymer of the formula (V)

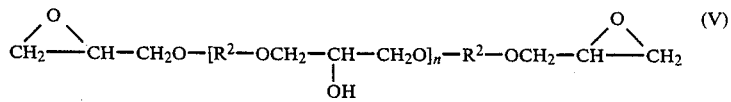

in which R² and n are as defined above, with at least one of
(α) dicarboxylic acids of the formula (VI)

HOOC—R¹—COOH (VI)

in which R¹ is as defined above,
(β) a mixture of monocarboxylic acids of the formula (VII)

H—R¹—COOH (VII)

in which R¹ is as defined above, and dicarboxylic acids corresponding to the formula (VI) initially with monocarboxylic acids (VII) and/or dicarboxylic acids (VI) and then with dicarboxylic and/or tricarboxylic anhydrides to form a polymer of the formula (I)

in which $R^1$, $R^2$, n and A are as defined above, and B independently represents H or group of formula

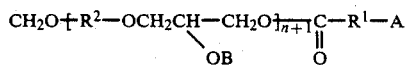

wherein $R^1$ and A are defined above and thereafter
(b) reacting isocyanates of the formula (IX)

$$OCN-R^3-NCO \qquad (IX)$$

in which $R^3$ is as defined above,
(α) in a molar ratio of 1:0.9 to 1:1.1 with a compound from the group consisting of alcohols, phenols, oximes, ε-caprolactam, malonic ester and ethyl acetoacetate as masking agent and the isocyanates thus partially masked are reacted with not more than about 50% of the free OH groups of the polymer (I), in which B represents independently H or a group of formula (II), to form the polymer (I), in which $R^1$, $R^2$, n, A and B are as defined above, or
(β) isocyanates corresponding to general formula (IX) with the masking agents to completely mask the isocyanate and mixing the isocyanates thus completely masked with the polymer (I);
(c) dissolving the polymer (I) containing the bound isocyanate hardener or polymer (I) and completely masked isocyanate in an organic solvent to form a solution,
(d) neutralizing the solution or mildly alkalizing the solution with a base;
(e) adding an emulsifier to the solution;
(f) diluting the solution with water to form a dispersion;
(g) acidifying the resulting dispersions;
(h) removing the organic solvent; optionally,
(i) a starter suitable for autophoretic deposition is added.

18. A process of claim 17 wherein a starter suitable for autophoretic deposition is added to the dispersion.

19. A process of claim 17 wherein a polymer of the bisphenol A/epichlorohydrin type is used as the polymer of the formula (V).

20. A process of claim 17 wherein the dicarboxylic acids used are aliphatic dicarboxylic acids containing 2 to 16 carbon atoms in the aliphatic radical.

21. A process of claim 17 wherein at least one acid selected from a dimer fatty acid and terephthalic acid is the dicarboxylic acid.

22. A process of claim 17 wherein the monocarboxylic acids are selected from aliphatic carboxylic acids containing 2 to 16 carbon atoms in the alkyl radical.

23. A process of claim 17 wherein in step (a) mixtures of monocarboxylic acids and dicarboxylic acids in a molar ratio of 0:1 to 1:1 are reacted with the polymer (V).

24. A process of claim 17 wherein in step (b) isocyanates of formula (IX), in which $R^3$ is at least one of

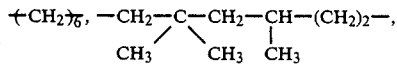

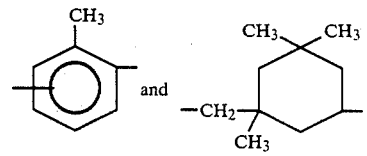

are reacted.

25. A process of claim 17 wherein the masking agents are at least one of ε-caprolactam and butanone-2-oxime.

26. A process of claim 24 wherein the molar ratio of isocyanate to masking agent is 1:0.9 to 1:1.1.

27. A process of claim 25 wherein the molar ratio of isocyanate to masking agent is 1:0.9 to 1:1.1.

28. A process of claim 17 wherein the individual process steps are carried out in an inert organic solvent.

29. A process of claim 28 wherein the solvent comprises at least one solvent selected from the group consisting of toluene, xylene, methylisobutylketone, methylethylketone, cyclohexanone, and glycol acetate.

30. A process of claim 17 wherein the solution is neutralized with at least one of ammonia and volatile amines.

31. A process of claim 17 wherein the emulsifier comprises at least one composition from the group fatty alcohol ether sulfates and nonylphenol ether sulfates.

32. A process of claim 17 wherein the dispersion is acidified by addition of at least one acid from the group orthophosphoric acid, formic acid or acetic acid.

33. A process for the autophoretic coating of metallic surfaces wherein the metallic surfaces are contacted with a dispersion of claim 5.

34. A process for the autophoretic coating of metallic surfaces wherein the metallic surfaces are contacted with a dispersion of claim 6.

35. A process for the autophoretic coating of metallic surfaces wherein the metallic surfaces are contacted with a dispersion of claim 7.

36. A process for the autophoretic coating of metallic surfaces wherein the metallic surfaces are contacted with a dispersion of claim 8.

37. A process for the autophoretic coating of metallic surfaces wherein the metallic surfaces are contacted with a dispersion of claim 9.

38. A process for the autophoretic coating of metallic surfaces wherein the metallic surfaces are contacted with a dispersion of claim 10.

39. A process for the autophoretic coating of metallic surfaces wherein the metallic surfaces are contacted with a dispersion of claim 11.

40. A process for the autophoretic coating of metallic surfaces wherein the metallic surfaces are contacted with a dispersion of claim 12.

41. A process for the autophoretic coating of metallic surfaces wherein the metallic surfaces are contacted with a dispersion of claim 13.

* * * * *